Figure 1:
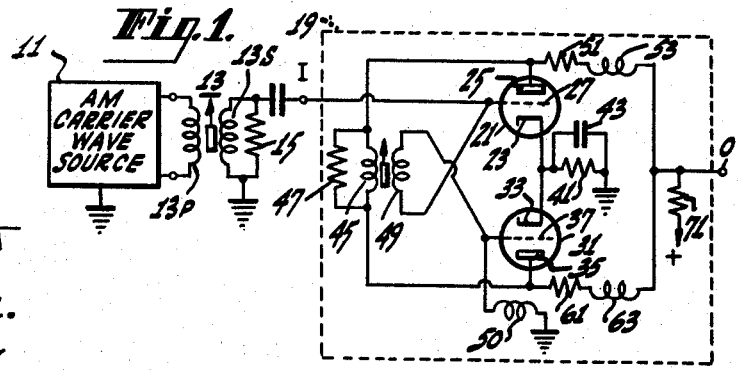
Figure 2A:
Figure 2B:
Figure 2C:
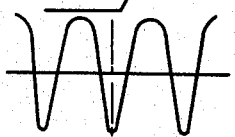
Figure 2D:
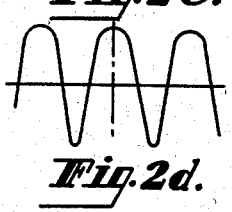

Oct. 25, 1960 R. W. SONNENFELDT ET AL 2,957,982

DETECTION APPARATUS

Filed Aug. 5, 1957 2 Sheets-Sheet 1

INVENTORS
RICHARD W. SONNENFELDT &
GEORGE M. DALY, DECEASED
ELEANOR K. DALY, EXECUTRIX

ATTORNEY

Oct. 25, 1960 R. W. SONNENFELDT ET AL 2,957,982
DETECTION APPARATUS
Filed Aug. 5, 1957 2 Sheets-Sheet 2

INVENTORS
RICHARD W. SONNENFELDT &
GEORGE M. DALY, DECEASED
ELEANOR K. DALY, EXECUTRIX

ATTORNEY

United States Patent Office
2,957,982
Patented Oct. 25, 1960

2,957,982

DETECTION APPARATUS

Richard W. Sonnenfeldt, Haddonfield, N.J., and George M. Daly, deceased, late of Collingswood, N.J., by Eleanor K. Daly, executrix, Collingswood, N.J., assignors to Radio Corporation of America, a corporation of Delaware Filed Aug. 5, 1957, Ser. No. 678,462

8 Claims. (Cl. 328—13)

The present invention relates generally to signaling systems, and more particularly to novel and improved apparatus for detection of AM waves, the term AM being used herein in a generic sense to connote waves subjected originally to an amplitude modulation process and apart from the form of transmission system (e.g., double sideband, vestigial sideband, or single sideband) through which the waves are subsequently passed.

In AM signal receivers, such as the usual television receiver or the usual AM radio receiver, it is conventional to use a so-called envelope detector for demodulation of the received AM waves, a diode constituting the most widely used form of envelope detector. It has, however, been suggested in the past that so-called "synchronous detectors" be used in place of the usual envelope detector to realize certain advantages thereof. Various forms of "synchronous detectors" have thus been proposed for AM detection, and particularly for use in signaling systems of a single sideband or vestigial sideband character. Interest in "synchronous detectors" in connection with signaling systems of such character is, at least in part, prompted by the recognition that the envelope of the AM carrier is not a truly accurate representation of the original modulating wave in such signaling systems. In the use of "synchronous detectors," reproduction of the original modulating wave is usually sought to be effected via what is termed "product detection," rather than envelope detection. Improvements in the receiver selectivity have usually been claimed for proposed synchronous detector arrangements.

Despite alleged advantages thereof, the various synchronous detector schemes heretofore proposed have found little or no commercial success in broadcast receivers for AM radio or television. In general, it may be said that the improvements attained have not been commensurate with the expense and circuit complications involved over those of the conventional envelope detector.

The present invention is directed toward novel AM detection apparatus of such a character that demodulation of AM waves is effected thereby via product detection substantially to the exclusion of envelope detection, whereby substantially faithful reproduction of the original modulating wave is attained in the demodulating operation. In accordance with the present invention, such a result is effected through the use of relatively simple and inexpensive circuitry, with performance of marked stability. Minimization of envelope detection products is one of many significant features of the present invention.

The novel AM detection apparatus of the present invention is of a type wherein a so-called locked oscillator is used as the AM detector. Locked oscillator detectors have heretofore been proposed for FM detection purposes, and in at least one instance, for AM detection purposes. Significant distinctions in structure, performance and results of the locked oscillator detector of the present invention over those of the prior art will be subsequently demonstrated and readily recognized by those skilled in the art.

The present invention recognizes that in the use of a locked oscillator detector for AM detection purposes, in contrast with FM detection purposes, it is desirable that the locally generated oscillations lock "in phase" with the incoming carrier waves in the electron stream (or the like) of the oscillating device or devices. It should be pointed out at this time that the term "in phase" is here used to contrast with quadrature (90°) phase relationship (appropriate for FM detection purposes), and is herein meant to include lock-in (at the center of the lock-in range) at either a substantially 0° phase relationship or at a substantially 180° phase relationship.

The present invention involves further recognition that such "in phase" lock-in operation can readily be effected where the oscillator operates in a mode of amplitude saturation; that is, where the peak-to-peak amplitude of the oscillator output voltage remains essentially constant irrespective of the application of incoming signals thereto.

In accordance with particular embodiments of the present invention, an oscillator operating in such an amplitude saturated condition is obtained using a pair of signal translating devices interconnected as a push-pull oscillator. A tank circuit is connected between corresponding output electrodes of the two devices; energy developed in the tank circuit is fed back to corresponding input electrodes of the two devices in a push-pull manner. An output circuit is provided in which the output current paths of the two devices are effectively in parallel. The two devices are suitably biased illustratively to a point in the middle of their operating range. The AM signals to be demodulated are applied to the input electrodes of the two devices effectively in push-pull. Application of the input signals has substantially no effect on the peak-to-peak output voltage or peak-to-peak current in the oscillator output circuit; the application of signals does, however, as will be later more readily understood, affect the average output. So long as the carrier frequency of the applied AM signals is within the lock-in range of the oscillating detector, the push-pull oscillator tends to lock in a substantially "in phase" relationship to the carrier, and a signal appears in the oscillator output circuit which represents the resultant of product detection of the received AM signal substantially to the exclusion of any resultant of envelope detection thereof. It will be subsequently shown that the output signal thus obtained represents the changes in energy feedback in the oscillator loop necessary to maintain constant peak-to-peak output.

In accordance with a particular embodiment of the present invention disclosed herein, the translating devices in the oscillator comprise conventional triode sections. The plates of the triodes are interconnected by a parallel resonant circuit tuned to the anticipated frequency of the AM carrier to be demodulated. A feedback winding, coupled inductively to the plate tank circuit is connected between the control grids of the respective triode sections. A common cathode circuit is provided for the two triode sections. A D.C. return for the triode control grids is provided via a radio frequency choke, and the triode plates are each connected to a common source of plate potential via additional radio frequency chokes. As a result, the tank circuit and grid winding coupled thereto are "floating" with respect to A.C. ground. Input signals are applied to the respective triode control grids effectively in a push-pull manner. Signal output is taken across a plate resistor common to both triode plates.

A locked oscillator detector in accordance with the above-described embodiment has been observed to be well adapted to operation in the desired mode of amplitude saturation. By virtue of the generally balanced oscillator arrangement, and in particular the "floating" of the tank circuit and grid winding coupled thereto with respect to A.C. ground, the particularly described embodiment inherently provides a double ended clamping of the oscillator output; i.e., the detector operates as an excellently self-regulating oscillator, which insures the desired tendency to "in phase" lock-in. While a more detailed explanation of this significant feature will be subsequently presented, it may now be briefly observed that during each half cycle of oscillation, one triode section approaches cut-off, while the other reaches the drawing of grid current. As each reaches grid current on alternate half cycles of the oscillation, a virtual ground is shifted from one side to the other of the feedback winding in the grid circuit. The "floating" feature of the present invention provides further important practical advantages in receiver utilization in that problems of chassis currents and of local carrier feedback to circuitry preceding the detector are substantially avoided.

As previously noted, it is desired for the purposes of the present invention to eliminate products of envelope detection of the AM carrier, and a significant feature of the above-described embodiment is the minimization of these products. A general explanation of the achievement of this desired result by the above-described embodiment may be made by observing that a substantial mutual cancellation of envelope detection products caused by grid rectification of the AM carrier and envelope detection products caused by plate rectification of the AM carrier inheres in the described detector circuitry. By appropriate adjustment of the value of the resistance in the common cathode circuit, the above-mentioned cancellation may readily be maximized.

Use of detector apparatus in accordance with the present invention in an AM signal receiver, such as a black-and-white television receiver, for example, very significantly affects the receiver performance and freedom of receiver design. Improvements in signal-to-noise ratio of the substantial order of 11 to 12 db on weak signals, over receivers using conventional envelope detectors, can readily be obtained. The selectivity associated with the detector performance is so substantial that complete elimination of the usual traps in the RF and IF channels of the receiver is feasible. Elimination of the need for accompanying sound attenuation in the circuitry preceding the detector readily permits simplification of the receiver's sound channel. In application of the detector apparatus of the present invention to color television receivers, elimination of the need for trapping of the accompanying sound carrier at intermediate frequencies removes a most significant source of design problems for the color receiver designer seeking to obtain maximum color channel sensitivity without deleterious phase distortion.

Detector apparatus in accordance with the present invention provides the further advantage of improved transient response; this is primarily noticeable on strong signals, particularly under high modulation percentage conditions. In addition to markedly improved performance with respect to random noise, a noticeable alteration in the operation of a receiver in the presence of impulse noise occurs with use of the present invention. Impulse noise appears in the output of our novel detection apparatus as a spectrum of noise centered about a frequency corresponding to the difference between the picture carrier intermediate frequency and the center of the IF channel's passband. So long as the receiver's sync signal channel is provided with a suitable high frequency cut-off appropriately below the center of the noise spectrum, relatively noise free sync circuits are easily provided. The use of the usual noise inverter in the receiver's sync signal channel is thus obviated by use of the present invention. Raster stability, even under extreme conditions of impulse noise interference, is excellent.

Correct tuning of a television receiver is believed to be rendered more readily ascertainable through use of the present invention, since tuning is readily determined as correct by viewing the picture when within the lock-in range, and similarly readily determined as incorrect by viewing the picture when outside the lock-in range. The lock-in range for the oscillator detector of the present invention is readily made sufficiently wide to avoid the necessity for hair line tuning by the operator of the receiver controls, and to allow considerable leeway for local oscillator drifts, etc. An oscillating detector in accordance with the present invention is itself not subject to serious drifts, having inherent frequency stability. In connection with the feature of this frequency stability, it may be observed that the oscillations produced by the push-pull oscillator of the present invention are relatively free of odd harmonics, which tend to cancel out. A relatively strong second harmonic component is produced by the oscillator which, however, does not adversely affect the frequency stability of the oscillator as could the odd harmonic components were they not effectively cancelled.

While numerous other advantages of the present invention may be set forth, it may be in order to briefly summarize the foregoing preliminary description of the invention and its advantages by stating that the present invention provides novel AM signal detection apparatus of a locked oscillator type having the advantages of simplicity of structure, stability of operation, freedom from RF feedback problems, and making readily feasible, for example, television receivers which, through the use of product detection to the substantial exclusion of envelope detection, obtain substantial improvements in signal-to-noise ratio, excellent selectivity without the need for signal distorting traps, relatively noise free sync channels, simplified sound channels and improved facility for correct tuning. A primary object of the present invention is thus to provide novel and substantially improved AM signal detection apparatus.

A further object of the present invention is to provide novel signal detectors capable of demodulating AM carrier waves via product detection to the substantial exclusion of envelope detection.

An additional object of the present invention is to provide a novel locked oscillator detector for AM carrier waves, which detector readily achieves and maintains substantially "in-phase" lock-in with an applied carrier.

Another object of the present invention is to provide a novel self-regulated locked oscillator detector for AM demodulation.

A further object of the present invention is to provide AM signal receivers with novel detection apparatus resulting in improved receiver selectivity and noise performance.

Figure 3A:
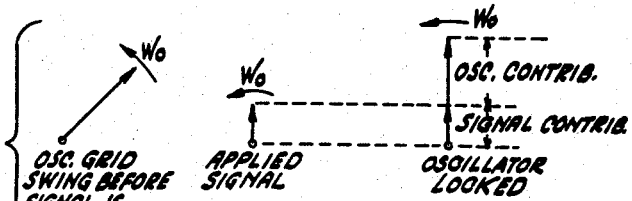
Figure 3B:
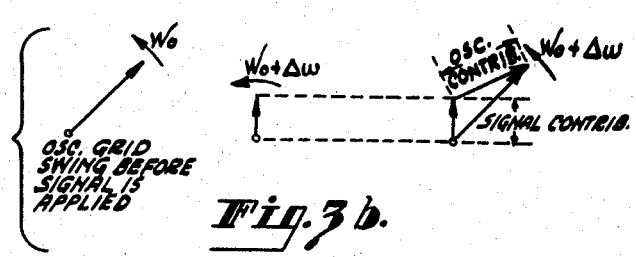

Other objects and advantages of the present invention will be readily ascertained by those skilled in the art after a reading of the following detailed description and inspection of the accompanying drawings which include:

Figure 1, which illustrates schematically AM signal detection apparatus in accordance with the embodiment of the present invention;

Figures 2A, 2B, 2C, and 2D which illustrate graphically voltage waveforms of aid in explaining the operation of the embodiment of Figure 1;

Figures 3A and 3B, which illustrate graphically vector diagrams of aid in explaining the operation of the embodiment of Figure 1; and Figures 4, 5, 6, 7 and 8, which illustrate schematically modifications of the circuit of Figure 1 in accordance with other embodiments of the present invention.

Referring more specifically to Figure 1, a source 11 of amplitude modulated carrier frequency waves which may, for example, comprise the IF strip of a broadcast receiver, drives the primary winding 13P of a transformer 13. The secondary winding 13S, shunted by a resistor 15, is coupled via a capacitor 17 to the input terminal "I" of a novel signal detector 19 embodying the principles of the present invention.

The detector 19 includes a pair of signal translating devices 21 and 31, illustratively shown as respective triodes. The respective triode cathodes 23 and 33 are tied together, and commonly connected to a point of reference potential (i.e., ground in the illustrative embodiment) via a cathode resistor 41, shunted by a capacitor 43. The respective triode plates 25 and 35 are interconnected by means of a coil 45 shunted by a resistor 47. The rsepective triode control grids 27 and 37 are interconnected by means of a coil 49 inductively coupled to the coil 45. Suitable tuning means, such as the schematically indicated tuning slug are provided for resonating the coupled coils 45 and 49 at a predetermined frequency $f_0$, the nominal carrier frequency of the AM waves supplied by source 11. The signal input terminal "I" is directly connected to the control grid 27, and the control grid 37 is returned to ground through a radio frequency choke 50. The plate 25 is connected to the detector output terminal "O" by means of a resistor 51 in series with a radio frequency choke 53; the plate 35 is similarly coupled to the output terminal "O" by means of a resistor 61 in series with a radio frequency choke 63. A common load resistor 71 is connected between the common output terminal "O" and a suitable source of plate potential (not illustrated).

In explanation of the operation of the embodiment of Figure 1, it may first be generally noted that the signal detector circuit 19 performs the following functions: (a) a local carrier is generated by the push-pull inductive feedback from the plates 25 and 35 to the grids 27 and 37; (b) the local carrier is locked in frequency to the carrier of an incoming signal from source 11, the phase relationship being in-phase when the free running oscillation frequency $f_0$ is the same (or very close) to the received signal carrier frequency $f_c$; (c) an output is obtained proportional to the product of the received and locally generated waves. The single circuit 19 performs the functions of a locked oscillator, a carrier-synchronous detector, and a signal amplifier, which would conventionally require distinct and separate circuits for their performance.

To appreciate the self-regulating mode of oscillation inherent in the oscillating detector circuit 19, it should be observed that, since no center taps (and no RF ground connections) are provided in the grid and plate circuits, all current entering each coil (i.e., coil 45 between plates 25 and 35 and coil 49 between grids 27 and 37) at one end must leave at the other end. This provides automatic current balance in the two tubes 21 and 31 independent of their $g_m$. It also results in an oscillation of a substantially constant amplitude such as to drive each grid from a voltage substantially at cut-off to the grid current point. As one of the tubes cuts off, the positive feedback loop opens up, preventing any further increase in the energy already in the tuned circuit, and simultaneously the other tube grid clamps to the cathode voltage. This results in a shift of the virtual ground in the grid coil 49 to that end clamped by the grid at cathode voltage. During the next half cycle, the action reverses and the grid virtual ground shifts to the other grid. Thus each end of the grid coil 49 will be virtually grounded once during the oscillation cycle.

It is to be especially noted that when one grid clamps, the other is an open circuit, and since, there being no RF ground return, the clamping is extremely tight since substantially zero current will flow through the clamping grid-cathode diode. It is thus observed that each grid will swing between the limits of cut-off voltage and cathode voltage as long as the positive feed-back in the circuit is sufficiently high. The actual oscillation amplitude will depend on the cathode voltage, and the grid cut-off voltage which is primarily determined by the plate voltage.

The oscillatory swings of voltage at grid 27, grid 37, plate 25, and plate 35 are illustrated graphically in Figures 2a, 2b, 2c and 2d, respectively.

In use of the oscillator for demodulation, incoming modulated carrier waves are capacitively coupled to one end of the grid coil 49 (or, alternatively, to one end of the plate coil 45 without any change in circuit performance, if the coil coupling is tight). Signal energy can change the plate current in the circuit only when the virtual ground is in the center. If one grid clamps, the other is cut off, and the signal can then cause no change in the circuit. If the incoming carrier frequency is the same as the oscillator frequency, the phase relationship of the two carriers in the oscillator coils must be in-phase, since any other phase relationship would cause currents to flow in quadrature with the oscillator current and result in detuning of the oscillator. However, the total voltage swing between the grids must stay constant in view of the detector circuit's mode of oscillation explained above. This can only happen if the oscillator's contribution to the grid-to-grid voltage swing decreases as the signal contribution increases. The result is a higher average current in the oscillator than before the signal was applied, due to generation of additional harmonics or, what is here effectively the same thing, longer dwell-time in the grid clamped portions of the cycle. Thus the average plate voltage falls with increasing signal and an output is obtained proportional to the in-phase component of the received signal. The vector diagrams of Figure 3a illustrate the foregoing explanation of the detection operation.

If the signal frequency differs slightly from the oscillator but causes locking, the total voltage swing must stay constant as before but a reactive current is needed to tune the oscillator to the signal frequency. This current is obtained from the signal carrier which will stand displaced in phase from the locally generated carrier. Under these conditions the oscillator contribution will be greater than when the incoming carrier and the locally generated carrier have exactly the same frequency, as illustrated by the vector diagrams of Figure 3b. The angle when locked cannot exceed 90° since at that point all the avatilable signal current is reactive and no frequency pulling beyond this point is possible.

For frequencies beyond the locking range, the output is a beat frequency. For a modulated signal whose sideband frequencies exceed the locking range, locking occurs for the carrier and the sidebands appear as a beat frequency output representing the original modulation.

The output signal appearing in the output circuit of detector 19 represents the product of the received and locally generated waves; i.e., detection is achieved via product detection. As noted previously, this form of detection process is particularly desirable where signal transmission is of a single sideband or vestigial sideband character, and where the envelope of the modulated carrier is thus not truly representative of the original modulation intelligence. In many "synchronous detector" arrangements of the prior art, the advantages of achieving product detection of the received carrier waves were reduced by the additional undesired achievement of envelope detection of the received carrier waves.

Where grid-controlled tubes, such as the triodes 21 and 31 of the subject circuit, are used as the detecting devices, there are two possible manners of effecting envelope detection, i.e., grid-rectification and plate-rectification. In operation of the subject detector circuit it is believed that both grid-rectification and plate-rectification of the received carrier waves take place. The envelope detection resultant of grid-rectification appears in the detector output circuit, however, in phase opposition to the envelope detection resultant of plate-rectification appearing therein. By suitable choice of the size of the common cathode resistor 41, substantially complete mutual cancellation of these envelope detection resultants can readily be achieved. The subject detector is thus capable of demodulating AM carrier waves via product detection to the substantial exclusion of envelope detection.

Figure 4:
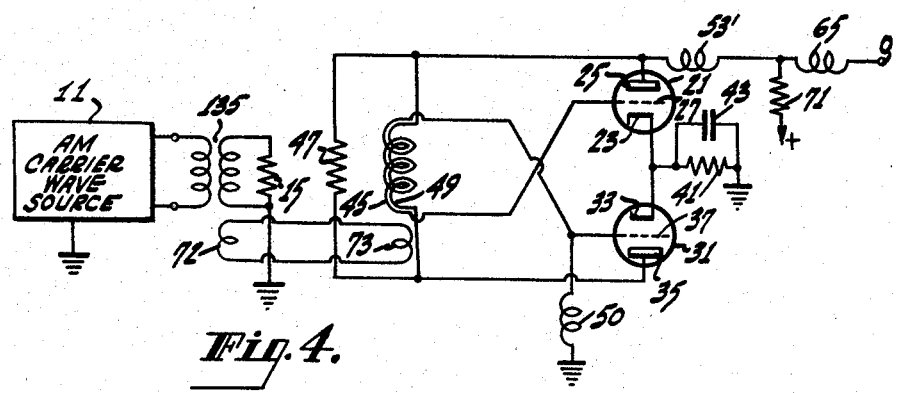

Figure 4 illustrates schematically a modification of the detector circuit 19 shown in Figure 1. It will be noted that the same reference numerals have been used to designate elements of the Figure 4 embodiment which are common to Figure 1. A first difference to be noted between the two embodiments is the manner of coupling signals from the transformer 13 to the oscillator tank circuit. In the Figure 4 embodiment, link coils 72 and 73 are used to couple the incoming carrier waves to the oscillating detector coupled tank circuits, rather than the coupling capacitor 17 of Figure 1.

A further difference may be noted in that an unbalanced output circuit is provided, the plate potential source being connected to the triode plates by means of a single path comprising the load resistor 71 and an RF choke 53'. The junction between resistor 71 and choke 53' is coupled to the output terminal "O" via an additional RF choke 65.

Figure 5:
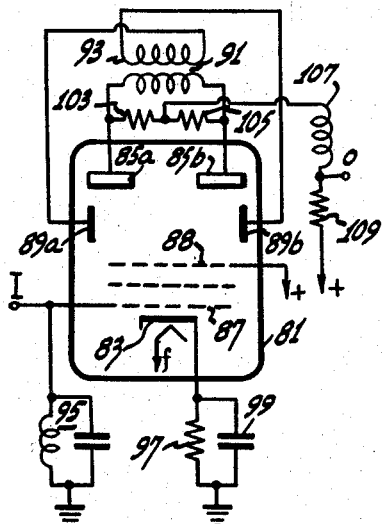

Figure 5 illustrates a modification of the detector apparatus of Figure 1 in accordance with another embodiment of the present invention. The Figure 5 embodiment involves use of a beam deflection type tube 81 in place of the pair of tubes 21 and 31 employed in the Figure 1 embodiment. The beam deflection tube 81 may, for example, be a type 6AR8 tube, which includes a thermionic cathode 83, a control grid 87, a screen grid 88, a pair of electronic receiving plates 85a and 85b, and a pair of deflection plates 89a and 89b. In operation of the beam deflection tube 81, a stream of electrons developed by cathode 83 and controlled in intensity by the signals appearing at control grid 87, is deflected by signals appearing at the deflecting plates 89a and 89b between two extremes of deflection; i.e., in one extreme of deflection the total electron stream is collected exclusively by plate 85a, in the other extreme of deflection the total electron stream is collected exclusively by plate 85b, and for intermediate deflections the electrons of the stream are collected by both plates in relative proportions determined by the degree and sense of deflection.

In use of the tube 81 for oscillating detector performance in accordance with the principles of the present invention, the plates 85a and 85b are interconnected by means of a coil 91. The deflecting plates 89a and 89b are interconnected by means of a coil 93, inductively coupled to the coil 91. Suitable tuning means, such as the schematically indicated tuning slug, are provided for resonating the coupled coils 91 and 93 at the frequency $f_o$, the nominal carrier frequency of the AM waves supplied by source 11. Signals from the source 11 are coupled to the control grid 87 via a resonant circuit 95, connected between control grid 87 and ground. A cathode resistor 97 is connected between cathode 83 and ground, and is shunted by a capacitor 99. One side of the coil 93 is returned to ground through a radio frequency choke 101. The plate 85a is connected to the detector output terminal "O" by means of a plate resistor 103 in series with a radio frequency choke 107; the plate 85b is similarly coupled to the output terminal "O" by means of a plate resistor 105 in series with the radio frequency choke 107. A common load resistor 109 is connected between the common output terminal "O" and a suitable source of plate potential (not illustrated).

It will be readily observed that operation of the Figure 5 embodiment is quite analogous to the operation of the previously described Figure 1 embodiment. In the absence of input signals, the tube 81 operates as an oscillator, the inductive feedback between signal plates 85a and 85b and deflecting plates 89a and 89b sustaining oscillations at a free-running frequency determined by the tuning of the coupled coils 91 and 93. It will be readily recognized that with suitable adujstments of the circuit parameters to insure full deflection of the electron stream in each operating cycle, the oscillator operates in the desired mode of amplitude saturation; the oscillations are doubly limited: at the peak of each half cycle of oscillation, one of the signal plates 85a and 85b receives the entire electron stream, while the other receives nothing, and at the peak of the next succeeding half cycle the roles of the respective signal plates are reversed. Through the use of the radio frequency chokes 101 and 107, the oscillator tank circuit is "floating" as in the Figure 1 embodiment. Application of the waves from source 11 to control grid 87 does not alter the peak-to-peak amplitude of the oscillations, but does alter the average current, as in the Figure 1 embodiment. Per previous discussions, it will be appreciated that the local oscillations generated by tube 81 will tend to lock in phase with the carrier of the modulated waves applied to control grid 87. Interaction of the local oscillations and the applied modulated carrier waves in the electron stream of tube 81 produces an output signal at output terminal "O" which represents their product. As in the Figure 1 embodiment, suitable choice of the value of cathode resistor 97 permits substantial elimination of envelope detection resultants in the output circuit.

Figure 6:
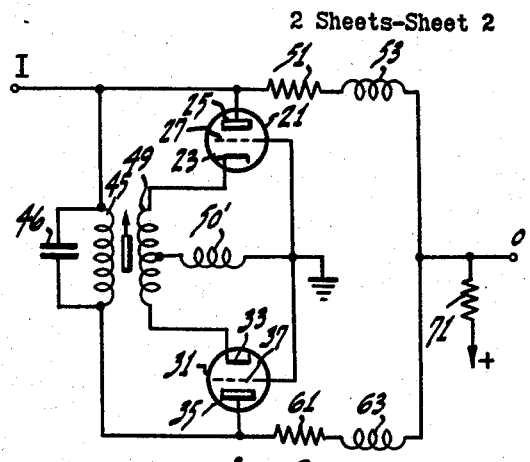

Figure 6 illustrates a modification of the detector apparatus 19 of Figure 1 in accordance with another embodiment of the present invention. A significant distinction between the Figure 1 embodiment and Figure 6 modification is that in the former plate-to-grid feedback is effected to sustain oscillations, whereas in the latter plate-to-cathode feedback is employed. Thus, in Figure 6, the coil 45 connected between plates 24 and 35 is inductively coupled to a coil 49 connected between the cathodes 23 and 33. The grids 27 and 37 are grounded, and the cathodes 23 and 33 are returned to ground via a radio frequency choke 50' connected to the center tap of the coil 49. Input signals are illustratively shown as being applied via terminal I to the plate 25 side of the coil 45; it will be appreciated that various other manners of application of input signals to the detector circuit may alternatively be employed.

Figure 7:
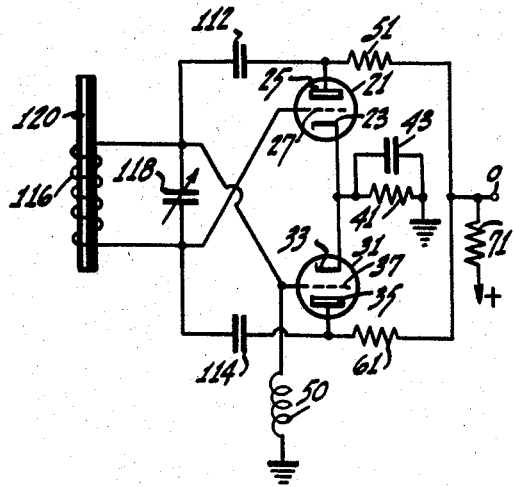
Figure 8:
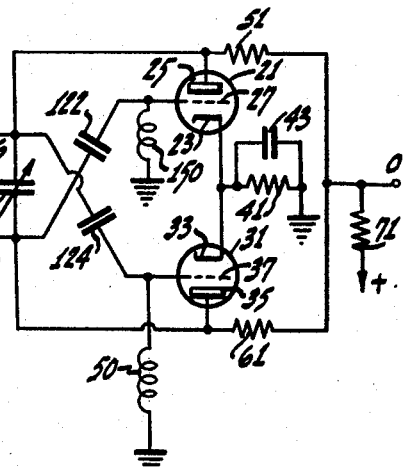

In Figures 7 and 8, additional modifications of the Figure 1 circuit are illustrated in accordance with further embodiments of the present invention, which embodiments are believed to be particularly appropriate for use in an AM radio receiver. The circuits of Figures 7 and 8 represent a departure from the previously discussed circuits in that capacitive feedback rather than inductive feedback is employed to complete the oscillation sustaining loop.

In Figure 7, capacitors 112 and 114 couple the plates 25 and 35, respectively, to opposite ends of a coil 116 connected between the grids 37 and 27. The grids 27 and 37 are returned to ground, as in the Figure 1 circuit, via a radio frequency choke 50 connected between the grid 37 and ground. Capacitive tuning means, comprising the variable shunt capacitor 118, is indicated for the coil 116, which may, for example, comprise the receiver's antenna coil with a ferrite rod core 120 of the type presently widely used in radio receivers. The cathode and plate circuits are substantially as shown in Figure 1; however, the radio frequency chokes 53 and 63 have been omitted.

In Figure 8, the antenna coil 116 and shunt tuning capacitor 118 are connected between the respective plates 25 and 35. The grids 27 and 37 are connected to opposite ends of the coil 116 by capacitors 122 and 124, respectively. In this embodiment, returns to ground via separate radio frequency chokes are provided for each of the control grids, RFC 150 being connected between control grid 27 and ground, and RFC 50 being connected between control grid 37 and ground. It will readily be appreciated that the use of the receiver's antenna coil itself in the oscillating detector tank circuit in the Figure

What is claimed is:

1. In a signalling system including a source of an amplitude modulated carrier wave, a demodulator comprising a pair of electron discharge devices, oscillation producing means comprising means for interconnecting said pair of electron discharge devices as a push-pull oscillator, means for locking the oscillations produced by said push-pull oscillator to said carrier wave comprising means for applying said modulated carrier wave to said pair of electron discharge devices effectively in push-pull, and means for deriving an output signal representative of the produce of said locked oscillations and said modulated carrier wave, said deriving means comprising an output circuit in which said pair of electron discharge devices are effectively connected in parallel.

2. In a signalling system including a source of carrier frequency waves modulated in amplitude in accordance with desired intelligence, a demodulator comprising a push-pull oscillator having an output circuit, means for controlling said push-pull oscillator in accordance with said amplitude modulated carrier frequency waves such that said push-pull oscillator produces carrier frequency oscillations bearing a substantially fixed predetermined phase relationship to said carrier frequency wave, and means for utilizing said push-pull oscillator to develop signals representing said desired intelligence in said oscillator output circuit by means of product detection of said amplitude modulated carrier frequency waves substantially to the exclusion of envelope detection of said amplitude modulated carrier frequency waves.

3. In a signalling system including a source of carrier frequency waves modulated in amplitude in accordance with desired intelligence, a synchronous demodulator comprising a push-pull oscillator having an output circuit, means for controlling said push-pull oscillator in accordance with said amplitude modulated carrier frequency waves such that said push-pull oscillator produces carrier frequency oscillations bearing a substantially fixed predetermined phase relationship to said carrier frequency waves, and means for utilizing said carrier frequency oscillations to recover from said amplitude modulated carrier frequency waves in said oscillator output circuit signals representing said desired intelligence by means of product detection of said amplitude modulated carrier frequency waves substantially to the exclusion of envelope detection of said amplitude modulated carrier frequency wave.

4. In a signalling system including a source of carrier frequency waves modulated in amplitude in accordance with desired intelligence, a synchronous demodulator comprising a push-pull oscillator having an output circuit, means for controlling said push-pull oscillator in accordance with said amplitude modulated carrier frequency waves such that said push-pull oscillator produces carrier frequency oscillations bearing a substantially fixed predetermined phase relationship to said carrier frequency waves, and means for utilizing said carrier frequency oscillations to recover from said amplitude modulated carrier frequency waves in said oscillator output circuit signals representing the resultant of product detection of said amplitude modulated carrier frequency waves substantially to the exclusion of signals representing the resultant of envelope detection of said amplitude modulated carrier frequency wave.

5. In a signalling system including a source of carrier frequency waves modulated in amplitude in accordance with desired intelligence, a synchronous demodulator comprising a push-pull oscillator having an output circuit, means for controlling said push-pull oscillator in accordance with said amplitude modulated carrier frequency waves such that said push-pull oscillator produces carrier frequency oscillations bearing a substantially fixed predetermined phase relationship to said carrier frequency wave, and means for deriving from said oscillator output circuit signals comprising the resultant of product detection of said amplitude modulated carrier frequency waves substantially to the exclusion of signals comprising the resultant of envelope detection of said amplitude modulated carrier frequency waves.

6. In a signalling system including a source of signals comprising carrier frequency waves modulated in amplitude in accordance with desired intelligence, a synchronous demodulator comprising a push-pull oscillator, means for locking said push-pull oscillator to said carrier frequency waves such that said push-pull oscillator produces carrier frequency oscillations in a substantially co-phasal relationship to said carrier frequency waves, means for restricting the range of signal frequencies over which said oscillator locking means is effective to a bandwidth relatively narrow compared with the modulation bandwidth associated with the signals of said source, and means for utilizing said locked oscillator as a product detector of said amplitude modulated carrier frequency waves.

7. In a system for receiving signals comprising amplitude modulated carrier frequency waves, demodulating means comprising the combination of a push-pull carrier frequency oscillator, means for synchronizing said push-pull carrier frequency oscillator with said amplitude modulated carrier frequency waves so as to lock said oscillator in a substantially co-phasal relationship with said carrier frequency waves, the synchronization bandwidth of said synchronizing means being substantially less than the bandwidth of said signals, and means for deriving the resultant of product detection of said amplitude modulated carrier frequency waves from the output of the thus synchronized oscillator.

8. Synchronous demodulation apparatus comprising the combination of means for establishing a first electron discharge path, means for establishing a second electron discharge path, each of said discharge path establishing means including a respective electron receiving element and each having associated therewith a control element for controlling the electron flow to the respective receiving element, means including a resonant circuit for effecting push-pull excitation of said control elements with energy derived from said electron receiving elements such as to sustain oscillations in said resonant circuit, a source of modulated carrier waves, means to modulate the electron flow in both said discharge paths in accordance with said modulated carrier waves, said resonant circuit being tuned to a frequency harmonically related to the nominal carrier frequency of said modulated carrier waves, and an output circuit effectively in shunt with both of said electron discharge paths.

References Cited in the file of this patent

UNITED STATES PATENTS

| | | |
|---|---|---|
| 2,079,134 | Terman | May 4, 1937 |
| 2,538,715 | Van Weel | Jan. 16, 1951 |
| 2,571,957 | Singel | Oct. 16, 1951 |
| 2,681,988 | Oliver | June 22, 1954 |
| 2,779,818 | Adler et al. | Jan. 29, 1957 |

FOREIGN PATENTS

| | | |
|---|---|---|
| 669,669 | Germany | Dec. 31, 1938 |